W. W. REYNOLDS.
Balance Scales.
No. 76,523. Patented April 7, 1868.
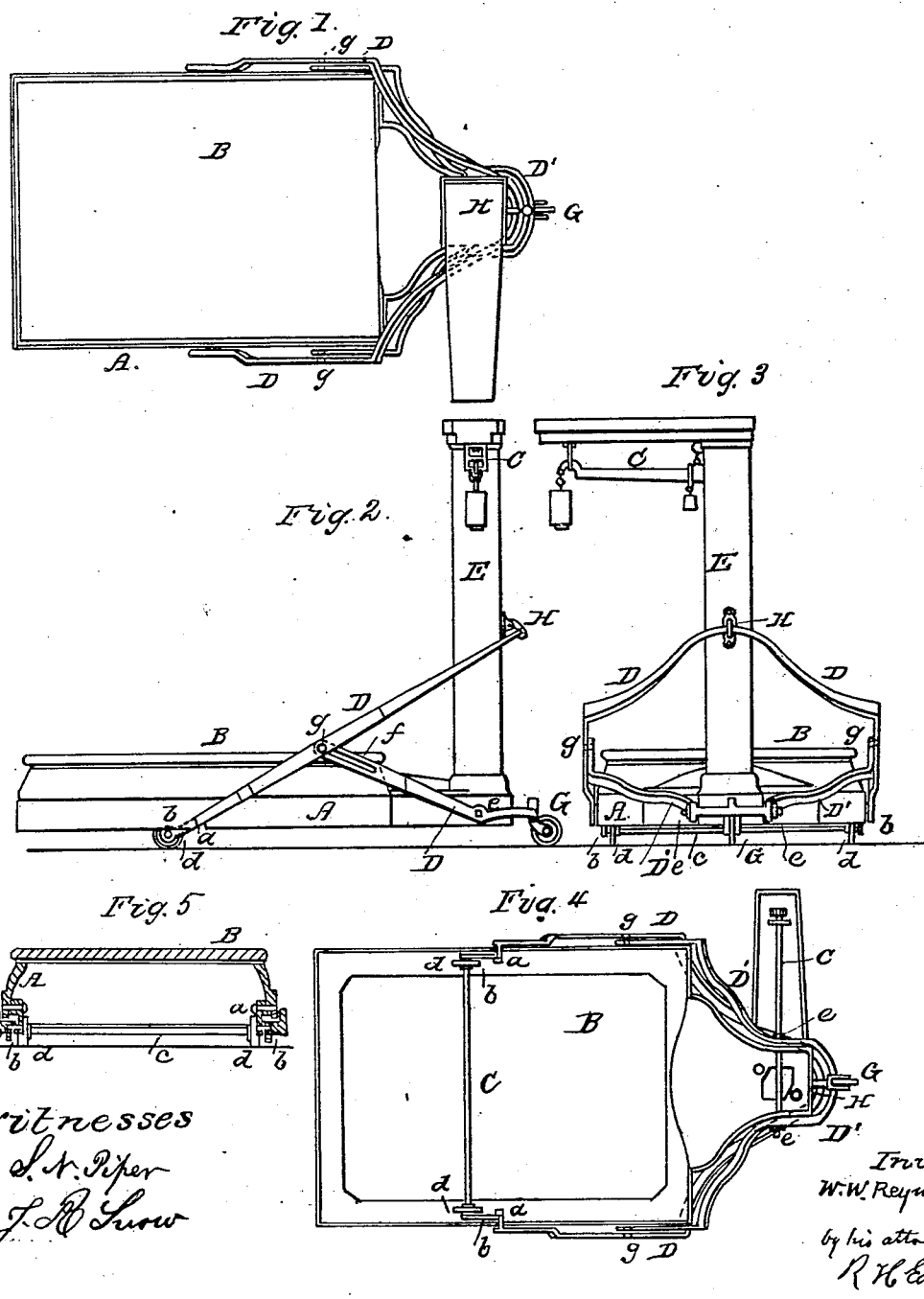

UNITED STATES PATENT OFFICE.

WILLIAM W. REYNOLDS, OF BRANDON, VERMONT, ASSIGNOR TO HOWE SCALE COMPANY, OF SAME PLACE.

IMPROVEMENT IN PLATFORM-SCALES FOR WEIGHING.

Specification forming part of Letters Patent No. 76,523, dated April 7, 1868.

*To all whom it may concern:*

Be it known that I, WILLIAM W. REYNOLDS, of Brandon, in the county of Rutland and State of Vermont, have invented a new and useful Improvement in Portable Platform-Scales for Weighing; and I do hereby declare the same to be fully described in the following specification and represented in the accompanying drawings, of which—

Figure 1 denotes a top view, Fig. 2 a side elevation, Fig. 3 an end elevation, and Fig. 4 an under-side view, of a platform-scale provided with my invention, by means of which the scale may be raised from a floor and supported by wheels and a caster resting thereon, or may be lowered down so as to rest directly on the floor, without being supported thereon by the wheels and caster, they being to enable the scale to be easily moved from place to place on the floor.

In the drawings, A denotes the base part of the frame for supporting the weighing apparatus. B is the platform, and C the weighing-lever of such apparatus, they being formed, combined, and supported as in ordinary portable platform-scales.

A yoke or bow-lever, D, spans the post E and the base part A, and has fulcra arranged on the said bow part, they being shown at $a$ $a$ in Fig. 4, and especially in Fig. 5, which is a vertical section of them and the base part. The shorter arms $b$ $b$ of the yoke or bow-lever are connected together by a rod, $c$, on which are two small wheels, $d$ $d$, they being free to revolve on the rod, and they are arranged thereon in manner as represented in Fig. 4. Another such bow-lever, D', spans the lower part of the base A, and has its fulcra arranged as shown at $e$ $e$ in the drawings. Each longer arm of the yoke or lever D' is slotted, as shown at $f$, and is arranged against the inner side of one of the longer arms of the yoke or lever D, from which a stud, $g$, projects and enters the next adjacent slot $f$.

A caster, G, is affixed to the middle of the lever D'. Furthermore, a gravitating hook or catch, H, hinged to the front side of the post E, and formed, as represented, to catch upon the yoke D while it is being raised up to it, and to hold it up in the position exhibited in Fig. 2.

While the longer arm of the yoke D is being raised the longer arms of the other yoke, D', will also be elevated, and the shorter arms of both yokes will be depressed. This will depress the wheels and caster upon and raise the scale off the floor, their positions being maintained so long as the catch may be in engagement with the yoke-lever D.

By lowering the longer arm of the yoke D the wheels and the caster will be raised and the scale will be depressed, so as to cause the base A to rest on the floor.

I claim—

The combination of the two yoke-levers and their wheels and caster, or the equivalent of the latter, with the platform-scale, the whole being arranged and to operate substantially as described.

WM. W. REYNOLDS.

Witnesses:
E. JUNE,
JNO. HOWE.